US012718139B2

(12) United States Patent
Qu et al.

(10) Patent No.: US 12,718,139 B2
(45) Date of Patent: Aug. 25, 2026

(54) SYSTEMS AND METHODS FOR IDENTIFYING MANUFACTURING DEFECTS

(71) Applicant: Samsung Display Co., Ltd., Yongin-si (KR)

(72) Inventors: Shuhui Qu, Fremont, CA (US); Janghwan Lee, Pleasanton, CA (US); Yan Kang, Sunnyvale, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 860 days.

(21) Appl. No.: 17/306,737

(22) Filed: May 3, 2021

(65) Prior Publication Data

US 2022/0318672 A1 Oct. 6, 2022

Related U.S. Application Data

(60) Provisional application No. 63/169,621, filed on Apr. 1, 2021.

(51) Int. Cl.
*G06N 20/00* (2019.01)
*G06N 3/045* (2023.01)
(Continued)

(52) U.S. Cl.
CPC ............... *G06N 20/00* (2019.01); *G06N 5/04* (2013.01); *G06N 3/045* (2023.01); *G06N 3/08* (2013.01)

(58) Field of Classification Search
CPC .......... G06N 5/04; G06N 20/00; G06N 3/045; G06N 3/08
See application file for complete search history.

(56) References Cited

U.S. PATENT DOCUMENTS 10,147,049 B2 12/2018 Chari et al.
10,325,224 B1 * 6/2019 Erenrich ................. G06N 5/04
(Continued)

FOREIGN PATENT DOCUMENTS

CN 110852983 A 2/2020
CN 111044525 A 4/2020
(Continued)

OTHER PUBLICATIONS

Davood Karimi, Deep learning with noisy labels: exploring techniques and remedies in medical image analysis, Mar. 20, 2020 (Year: 2020).*

(Continued)

*Primary Examiner* — Brian M Smith
(74) *Attorney, Agent, or Firm* — Womble Bond Dickinson (US) LLP

(57) ABSTRACT

Systems and method for classifying manufacturing defects are disclosed. In one embodiment, a first data sample satisfying a first criterion is identified from a training dataset, and the first data sample is removed from the training dataset. A filtered training dataset including a second data sample is output. A first machine learning model is trained with the filtered training dataset. A second machine learning model is trained based on at least one of the first data sample or the second data sample. Product data associated with a manufactured product is received, and the second machine learning model is invoked for predicting confidence of the product data. In response to predicting the confidence of the product data, the first machine learning model is invoked for generating a classification based the product data.

15 Claims, 8 Drawing Sheets

(51) Int. Cl.
*G06N 3/08* (2023.01)
*G06N 5/04* (2023.01)

(56) References Cited

U.S. PATENT DOCUMENTS

| | | | | |
|---|---|---|---|---|
| 10,436,720 | B2 | 10/2019 | He et al. | |
| 10,853,932 | B2 | 12/2020 | Cohen et al. | |
| 11,507,801 | B2 | 11/2022 | Huh et al. | |
| 2014/0303912 | A1 | 10/2014 | Banerjee et al. | |
| 2016/0189055 | A1 | 6/2016 | Zvitia | |
| 2017/0082555 | A1 | 3/2017 | He et al. | |
| 2017/0109205 | A1* | 4/2017 | Ahuja | G06F 9/5094 |
| 2018/0106732 | A1 | 4/2018 | Plihal et al. | |
| 2019/0019061 | A1* | 1/2019 | Trenholm | G06F 18/2411 |
| 2019/0219994 | A1* | 7/2019 | Yan | G05B 13/027 |
| 2019/0354857 | A1 | 11/2019 | Sallee et al. | |
| 2020/0057939 | A1 | 2/2020 | Ohashi et al. | |
| 2020/0090314 | A1 | 3/2020 | Mayr et al. | |
| 2020/0151578 | A1* | 5/2020 | Chen | G06N 20/00 |
| 2020/0166909 | A1 | 5/2020 | Noone et al. | |
| 2020/0210899 | A1* | 7/2020 | Guo | G06Q 20/4016 |
| 2020/0226742 | A1 | 7/2020 | Sawlani et al. | |
| 2020/0272854 | A1 | 8/2020 | Caesar | |
| 2020/0302157 | A1* | 9/2020 | Short | G06N 3/08 |
| 2020/0310539 | A1* | 10/2020 | Barachant | G06F 3/015 |
| 2020/0311615 | A1 | 10/2020 | Jammalamadaka et al. | |
| 2020/0349434 | A1* | 11/2020 | Zhang | G06N 3/042 |
| 2020/0387755 | A1* | 12/2020 | Hagen | G06F 18/2155 |
| 2021/0010953 | A1 | 1/2021 | Adler et al. | |
| 2021/0042618 | A1 | 2/2021 | Choung et al. | |
| 2021/0042643 | A1* | 2/2021 | Hong | G06N 20/00 |
| 2021/0102527 | A1 | 4/2021 | Liu et al. | |
| 2021/0174196 | A1* | 6/2021 | Desmond | G06F 18/2321 |
| 2021/0256420 | A1* | 8/2021 | Elisha | G06N 20/00 |
| 2021/0374941 | A1 | 12/2021 | Liu et al. | |
| 2021/0407062 | A1* | 12/2021 | Su | G06F 18/253 |
| 2022/0051074 | A1 | 2/2022 | Lin et al. | |
| 2022/0292661 | A1* | 9/2022 | Ng | G06T 7/10 |

FOREIGN PATENT DOCUMENTS

| | | | |
|---|---|---|---|
| CN | 112418313 | A | 2/2021 |
| JP | 2018-112863 | A | 7/2018 |
| JP | 2019-061494 | A | 4/2019 |
| KR | 10-2021-0017702 | A | 2/2021 |
| TW | 202018493 | A | 5/2020 |
| TW | 202105549 | A | 2/2021 |
| WO | 2019/238976 | A1 | 12/2019 |
| WO | 2020/073737 | A1 | 4/2020 |

OTHER PUBLICATIONS

Northcutt, C.G. et al., “Confident learning: estimating uncertainty in dataset labels,” downloaded from <arxiv.org/abs/1911.00068v4> (Feb. 15, 2021) 42 pp. (Year: 2021).*

Taiwanese Office Action dated Aug. 4, 2023, issued in Taiwanese Patent Application No. 111111504 (8 pages).

Taiwanese Office Action for TW Patent Application No. 111111505 dated Jan. 30, 2024, 6 pages.

Northcutt, C.G. et al., Confident Learning: Estimating Uncertainty in Dataset Labels, arXiv:1911.00068 v. 4, Feb. 15, 2021, 42 pages.

Karimi, Davood, et al., “Deep learning with noisy labels: exploring techniques and remedies in medical image analysis,” Medical Image Analysis, Dec. 2019, 22 pages.

Veit, Andreas, et al., “Learning from Noisy Large-Scale Datasets with Minimal Supervision,” 2017 IEEE Conference on Computer Vision and Pattern Recognition, IEEE, 2017, pp. 6575-6583.

EPO Extended European Search Report dated Jul. 26, 2022, issued in European Patent Application No. 22159396.5 (15 pages).

EPO Extended European Search Report dated Aug. 10, 2022, issued in corresponding European Patent Application No. 22158093.9 (8 pages).

US Office Action dated Jun. 3, 2024, issued in U.S. Appl. No. 17/317,806 (35 pages).

US Final Office Action dated Jan. 27, 2025, issued in U.S. Appl. No. 17/317,806 (29 pages).

Jun Liu, Chunyue Song, Jun Zhao, and Peng Ji, Manifold-Preserving Sparse Graph-Based Ensemble FDA for Industrial Label-Noise Fault Classification, Jul. 22, 2019 (Year: 2019).

Sifen Liao, Xiaoyu Jiang, and Zhiqiang Ge, Weakly Supervised Multilayer Perceptron for Industrial Fault Classification With Inaccurate and Incomplete Labels Sifen Liao, Dec. 24, 2020 (Year: 2020).

US Office Action dated Jul. 31, 2025, issued in U.S. Appl. No. 17/317,806 (35 pages).

Japanese Office Action corresponding to JP Application No. 2022-032160, dated Jan. 20, 2026 (4 pages).

US Office Action dated Feb. 6, 2026, issued in U.S. Appl. No. 17/317,806 (19 pages).

US Final Office Action dated Jun. 4, 2026, issued in U.S. Appl. No. 17/317,806 (20 pages).

* cited by examiner

400

| $\hat{Q}_{\tilde{y},y^*}$ | Y* = apple | Y* = pear | Y* = orange |
|---|---|---|---|
| $\tilde{Y}$ = apple | 0.25 | 0.1 | 0.05 |
| $\tilde{Y}$ = pear | 0.14 | 0.15 | 0 |
| $\tilde{Y}$ = orange | 0.08 | 0.03 | 0.2 |

SYSTEMS AND METHODS FOR IDENTIFYING MANUFACTURING DEFECTS

CROSS-REFERENCE TO RELATED APPLICATION(S)

The present application claims priority to and the benefit of U.S. Provisional Application No. 63/169,621 filed Apr. 1, 2021, entitled "IDENTIFY MANUFACTURING DISPLAY IMAGE DEFECT TYPES WITH TWO-STAGE REJECTION-BASED METHOD," the entire content of which is incorporated herein by reference.

FIELD

One or more aspects of embodiments according to the present disclosure relate to classifiers, and more particularly to a machine-learning (ML) classifiers for identifying manufacturing defects that use a two-pass approach to filter out low confident data samples.

BACKGROUND

The mobile display industry has grown rapidly in recent years. As new types of display panel modules and production methods are being deployed, surface defects have been harder to inspect using just traditional mechanisms. It would be desirable to employ artificial intelligence (AI) to automatically predict whether a manufactured display panel module is faulty or not. In fact, it would be desirable to employ AI to predict defects in other hardware products, and not just display panel modules.

The above information disclosed in this Background section is only for enhancement of understanding of the background of the present disclosure, and therefore, it may contain information that does not form prior art.

SUMMARY

An embodiment of the present disclosure is directed to a method for classifying manufacturing defects. In one embodiment, a first data sample satisfying a first criterion is identified from a training dataset, and the first data sample is removed from the training dataset. A filtered training dataset including a second data sample is output. A first machine learning model is trained with the filtered training dataset. A second machine learning model is trained based on at least one of the first data sample or the second data sample. Product data associated with a manufactured product is received, and the second machine learning model is invoked for predicting confidence of the product data. In response to predicting the confidence of the product data, the first machine learning model is invoked for generating a classification based the product data.

According to one embodiment, the first criterion is a confidence level below a set threshold.

According to one embodiment, the second data sample is associated with a confidence level above a set threshold.

According to one embodiment, the training of the second machine learning model includes invoking unsupervised learning based on the second data sample, wherein the second data sample is associated with a particular class.

According to one embodiment, the training of the second machine learning model includes: identifying a cluster associated with the particular class; and tuning a boundary of the cluster based on a tuning threshold, wherein the first machine learning model is invoked for generating the classification in response to determining that the product data is within the boundary of the cluster.

According to one embodiment, the training of the second machine learning model includes invoking supervised learning based on the first and second data samples, wherein the first data sample is identified as a first type of data, and the second data sample is identified as a second type of data.

According to one embodiment, the training of the second machine learning model includes: identifying a decision boundary for separating the first type of data from a second type of data; and tuning the decision boundary based on a tuning threshold, wherein the first machine learning model is invoked for generating the classification in response to determining that the product data belongs to the second type of data.

According to one embodiment, the method for classifying manufacturing defects includes: identifying second product data associated with a second manufactured product; invoking the second machine learning model for predicting confidence of the second product data; and rejecting the second product data based on the confidence of the second product data.

According to one embodiment, the method for classifying manufacturing defects further includes generating a signal based on the classification, wherein the signal is for triggering an action.

An embodiment of the present disclosure is also directed to a system for classifying manufacturing defects. The system includes a processor and memory. The memory has stored therein instructions that, when executed by the processor, cause the processor to: identify, from a training dataset, a first data sample satisfying a first criterion; remove, from the training dataset, the first data sample and outputting a filtered training dataset including a second data sample; train a first machine learning model with the filtered training dataset; train a second machine learning model based on at least one of the first data sample or the second data sample; receive product data associated with a manufactured product; invoke the second machine learning model for predicting confidence of the product data; and in response to predicting the confidence of the product data, invoke the first machine learning model for generating a classification based the product data.

An embodiment of the present disclosure is further directed to a system for classifying manufacturing defects. The system includes a data collection circuit configured to collect an input dataset, and a processing circuit coupled to the data collection circuit. The processing circuit has logic for: identifying, from a training dataset, a first data sample satisfying a first criterion; removing, from the training dataset, the first data sample and outputting a filtered training dataset including a second data sample; training a first machine learning model with the filtered training dataset; training a second machine learning model based on at least one of the first data sample or the second data sample; receiving product data associated with a manufactured product; invoking the second machine learning model for predicting confidence of the product data; and in response to predicting the confidence of the product data, invoking the first machine learning model for generating a classification based the product data.

As a person of skill in the art should recognize, the claimed systems and methods that filter out low confident data samples during training and inference help increase accuracy of predictions on covered data samples while minimizing the influence of out-of-distribution samples.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 4 is an example confusion matrix according to one embodiment;

DETAILED DESCRIPTION

Figure 1:
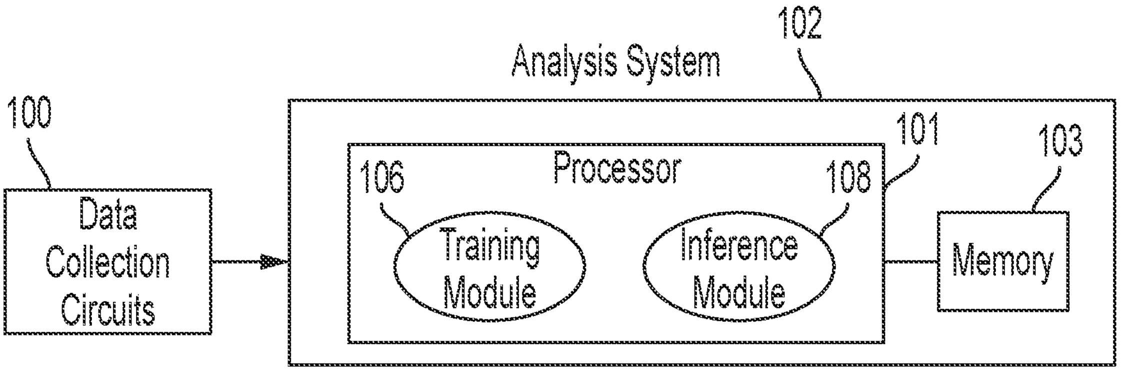
FIG. 1 is a block diagram of a system for making predictions relating to products manufactured via a manufacturing process according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

As new types of display modules and product methods are deployed, and as product specifications tighten, it may be desirable to enhance equipment and quality-control methods to maintain production quality. For example, it may be desirable to monitor for manufacturing defects during production.

One way to monitor for manufacturing defects is by employing human inspectors that have the expertise to identify the defects. In this regard, high-resolution (sub-micron level) images may be acquired around defect areas. A human inspector may then review the acquired images to classify the defects into categories in accordance with the type of the defects and how the defects may affect the production yield. In more detail, the human inspector may sample a number of defect images and spend significant time searching for features to separate unclassified defect images into categories. Training the human inspectors, however, takes time. Even when trained, it may take weeks for a human inspector to identify manufacturing defects in a current batch of images, making it hard to expand the human inspector's work to multiple instances at a time.

Machine learning (ML) models may be used for quicker detection of manufacturing defects that may be expanded to multiple instances at a time. In order for such ML models to be useful, however, they should be accurate in their predictions. In addition, the models should be generalized so that accurate predictions may be made even on new data sets that have not been encountered previously.

Various factors, however, may degrade the performance of ML models. One such factor may be erroneous labeling of training data, referred to as label noise. The erroneous labels may be due, for instance, to human error. For example, an image used for training may be labeled as depicting a type of manufacturing defect when in fact, no such defect exists, or, even if the defect does exist, the type of defect identified by the human person is erroneous. When an ML model is trained using erroneous labels, the accuracy of predictions by the ML model is reduced.

Another issue that may arise in using ML models is due to the small dataset that is often used to train the models. The sparse training dataset relative to the high dimensionality of the data may lead to overfitting of the model. When the model is overfitted, erroneously labeled data may not be rejected, but learned by the model. This may lead to predictions being made during deployment based on the erroneously labeled data, causing the model to perform poorly on new, unseen data.

In general terms, embodiments of the present disclosure are directed to identifying manufacturing defects using deep learning ML models. In one embodiment, a two-stage approach is used to filter out unconfident (also referred to as noisy) data. In this regard, data samples with noisy labels in a training dataset may be removed for training a first ML model (referred to as a defect detection model) so that the defect detection model is trained using confident (also referred to as clean) training data samples. The clean and noisy data may then be used to train a second deep learning ML model (referred to as an outlier detection model or outlier filter) that is used during deployment to filter out unconfident/noisy data samples. This may ensure that the data to be predicted by the defect detection model falls in a high-confident prediction area, improving the accuracy of predictions by the defect detection model.

In one embodiment, a boundary that is used by the outlier filter to filter out unconfident data is tuned using a tuning threshold hyperparameter. The threshold hyperparameter may be determined upon considering a tradeoff between a rejection rate (or amount of coverage of the data), and the accuracy of the prediction by the defect detection model. In one embodiment, accuracy of the prediction increases when coverage decreases. In this regard, the threshold hyperparameter may be selected based on identification of current requirements in terms of accuracy and/or coverage.

FIG. 1 is a block diagram of a system for making predictions relating to products manufactured via a manufacturing process according to one embodiment. The system includes, without limitations, one or more data collection circuits 100, and an analysis system 102. The data collection circuits 100 may include, for example, one or more imaging systems configured to acquire image data of a product during a manufacturing process such as, for example, X-ray machines, Magnetic Resonance Imaging (MRI) machines, Transmission Electron Microscope (TEM) machines, Scanning Electron Microscope (SEM) machines, and/or the like. The image data generated by the data collection circuits 100 may be, for example, spectroscopy images such as Energy-Dispersive X-ray Spectrocopy (EDS) images and/or High-Angle Annular Dark-Field (HAADF) images, microscopy images such as Transmission Electron Microscopy (TEM) images, thermal images, and/or the like. The acquired data samples may not be limited to still images, but may also include video, text, Lidar data, radar data, image fusion data, temperature data, pressure data, and/or the like.

The data collection circuits 100 may be placed, for example, on top of a conveyer belt that carries the product during production. The data collection circuits 100 may be configured to acquire data samples (e.g. image data) of a product multiple times (e.g. every second or few seconds) over a period of manufacturing time.

The analysis system 102 may include a training module 106 and an inference module 108. Although the training and inference modules 102, 106 are described as separate functional units, a person of skill in the art will recognize that the functionality of the modules may be combined or integrated into a single module, or further subdivided into further sub-modules without departing from the spirit and scope of the inventive concept. The components of the analysis system 102 may be implemented by one or more processors having an associated memory, including, for example, application specific integrated circuits (ASICs), general purpose or special purpose central processing units (CPUs), digital signal processors (DSPs), graphics processing units (GPUs), and programmable logic devices such as field programmable gate arrays (FPGAs).

The training module 106 may be configured to generate and train a plurality of machine learning models to be used for classifying product manufacturing defects. The plurality of machine learning models may be generated and trained based on training data provided by the data collection circuits 100. In one embodiment, two machine learning models are trained in two separate stages. In a first stage, a defect detection model may be trained using only the clean training dataset. In this regard, noisy/unconfident data bearing labels that are identified as erroneous are removed from the test dataset to generate the clean training dataset.

In one embodiment, the defect detection model is a joint fusion model trained using the clean test dataset from different types of data collection circuits 100 that have been integrated and trained together. The defect detection model need not be a joint fusion model but any deep neural network known in the art that is trained using information from a single source.

In a second stage, an outlier filter may be trained to filter out unconfident/noisy data samples during deployment. In one embodiment, the outlier filter is trained using unsupervised learning based on the clean training data samples identified in the first stage. In one embodiment, the outlier filter is trained using supervised learning based on the data samples labeled as noisy/unconfident in the first stage. The size of the classification clusters or decision boundaries may depend on the identified tuning threshold hyperparameter.

The inference module 108 may be configured to classify product manufacturing defects during deployment during an inference stage. In this regard, the data samples acquired by the data collection circuits 100 may be provided to the outlier filter for identifying confidence of the data samples. In one embodiment, the outlier filter is configured to determine whether a data sample is an outlier. For example, the data sample may be identified as an outlier if it cannot be clustered into one of the classification clusters generated based on the clean training data. In another example, the data sample may be deemed to be an outlier if it matches the features of data that is labeled as noisy/unconfident.

In one embodiment, a data sample identified as an outlier is removed. In this regard, removed data samples are not provided to the defect detection model for making predictions. Thus, data that is provided to the defect detection model is data that is deemed to be confident data, improving accuracy of classifications by the defect detection model. The classification made by the defect detection model may include classification of products as faulty or not faulty, classification of faulty products into defect categories, and/or the like. In one embodiment, the analysis system 102 may generate a signal based on the classification outcome. For example, the signal may be for prompting action by a human inspector in response to classifying the product as a faulty product. The action may be to remove the product from the production line for purposes of re-inspection.

Figure 2:
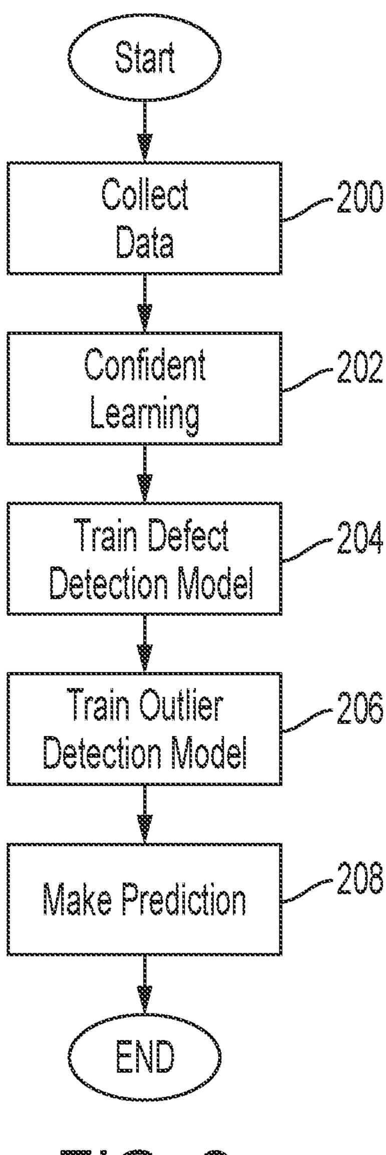
FIG. 2 is a flow diagram of a process for making predictions relating to products manufactured via a manufacturing process according to one embodiment.

FIG. 2 is a flow diagram of a process for making predictions relating to products manufactured via a manufacturing process according to one embodiment. It should be understood that the sequence of steps of the process is not fixed, but can be altered into any desired sequence as recognized by a person of skill in the art.

At block 200, data of products manufactured during the manufacturing process is captured by one or more of the data collection circuits 100. The captured data may be, for example, image data. In one embodiment, the image data of a particular product is captured concurrently by two or more disparate data collection circuits 100. For example, a first data collection circuit 100 may capture a TEM image of a product, and a second data collection circuit 100 may capture an HAADF image of the same product.

The data captured by the data collection circuits 100 may be used for training the ML models. In this regard, images around defect areas of a product that are acquired by the data collection circuits 100 may be reviewed and labeled by a human inspector for identifying the defect. Humans, however, are prone to errors, and the labels attached to the images may be erroneous at times. Labeling errors may be a problem as the accuracy of the models depend on the accuracy of the training data.

In one embodiment, the training module 106 engages in confident learning at block 202 for identifying and removing the noisy data samples in the training dataset. The noisy data samples may include image data that are predicted to be mis-labeled by the human inspector. In one embodiment, confident learning is based on an estimation of a joint distribution between noisy (given) labels, and uncorrupted (true) labels, as described in further detail in Northcutt et. al, "Confident Learning: Estimating Uncertainty in Dataset Labels," (2021) available at https://arxiv.org/abs/1911.00068v4, the content of which is incorporated herein by reference.

In one embodiment, in response to the confident learning at block 202, the training module 106 identifies the data samples in the training dataset that are predicted to be noisy, labels the identified data samples as noisy, and removes these data samples from the training dataset.

At block 204, the training module 106 trains the defect detection model based on the clean data samples in the filtered training dataset. The trained defect detection model may be, for example, a joint fusion model as described in U.S. patent application Ser. No. 16/938,812 filed on Jul. 24, 2020, entitled "Image-Based Defects Identification and Semi-Supervised Localization," or U.S. patent application Ser. No. 16/938,857, filed on Jul. 24, 2020, entitled "Fusion Model Training Using Distance Metrics," the content of both of which are incorporated herein by reference. In some embodiments, the defect detection model is single machine learning model (instead of a joint fusion model) configured with a machine learning algorithm such as, for example, random forest, extreme gradient boosting (XGBoost), support-vector machine (SVM), deep neural network (DNN), and/or the like.

At block 206, the training module 106 uses the noisy and/or clean data samples from the confident learning block 202 for training the outlier filter. One of supervised or unsupervised learning may be used to train the outlier filter. In the embodiment where supervised learning is used, clean and noisy data samples that have been labeled as such may be used to teach the outlier filter to classify data as noisy/unconfident or clean/confident. A decision boundary may be identified during the training for determining the boundary that separates the noisy data from the clean data. A machine learning algorithm such as, for example, logistic regression, may be used for identifying the decision boundary.

In the embodiment where unsupervised learning is used, the training module 106 invokes a clustering algorithm for finding similarities in the training data samples, and groups similar data samples into a cluster. A clustering algorithm such as a K-Means clustering algorithm may be used for generating the clusters.

In one embodiment, the training module 106 is further configured to tune the boundaries of the clusters, or the placement of the decision boundary, based on a tuning threshold hyperparameter. The tuning threshold may control how close the decision boundary or cluster is to the noisy data without being filtered out. The closer the boundary to the noisy data, the greater the coverage of the data samples that are kept for purposes of defect prediction. However, accuracy of the prediction may decrease as coverage decreases. In one embodiment, a desired coverage and/or accuracy are entered as inputs, and the training module 106 selects an appropriate tuning threshold as a function of the entered inputs.

At block 208, the trained outlier filter and the trained defect detection model are used at deployment for identifying defects in products, such as, for example, display panels. In one embodiment, the inference module 108 invokes the outlier filter to predict the confidence of the data samples captured by the data collection circuits 100 during a manufacturing process. In one embodiment, the outlier filter identifies the data samples that cannot be confidently clustered into one of the known classification classes (if the filter has been trained using unsupervised learning), and/or have features/parameters that cause the data to be classified as noisy/unconfident (if the filter has been trained using supervised learning), and removes such data samples from the captured dataset. The removed unconfident data samples may be deemed to be outlier data that may be the result of degradation in the machinery used in the manufacturing process.

In one embodiment, the inference module 108 invokes the defect detection model for making predictions in the cleaned, high-confidence data samples. In this manner, accuracy of predictions by the defect detection model may increase when compared to current art defect detection models.

Figure 3:
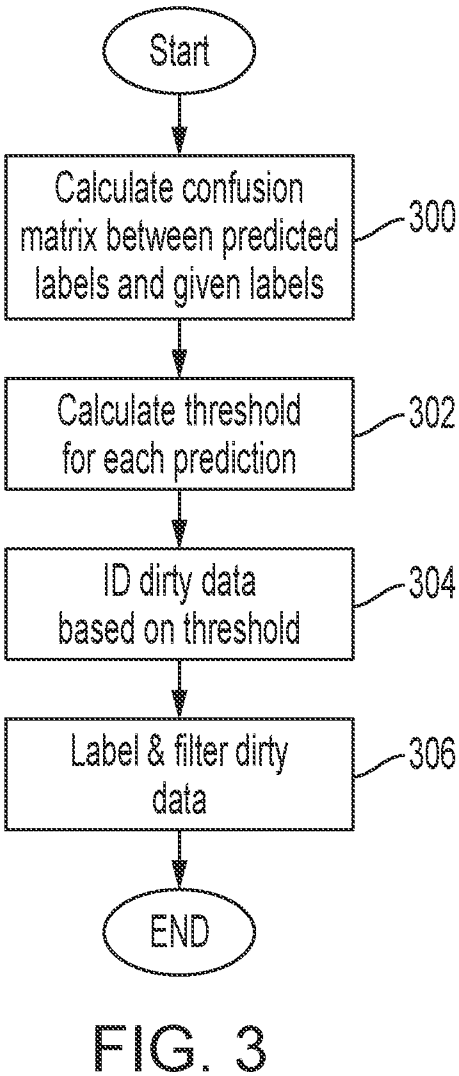
FIG. 3 is more detailed flow diagram of a confident learning process according to one embodiment.

FIG. 3 is more detailed flow diagram of the confident learning at block 202 according to one embodiment. At block 300, the training module 106 calculates a confusion matrix between predicted (true/correct) labels and given labels (by a human person) of a test dataset. A deep learning model may be invoked for predicting the true/correct label of a data sample in the test dataset. A confusion matrix may be generated based on a comparison of the predicted labels against the given labels. The confusion matrix may be a joint distribution between the predicted labels and given labels, for each predicted label. For example, given three possible classes of labels: apples, pears, and oranges, a first entry in the confusion matrix identify a probability that a data sample that is predicted to be an apple is actually labeled and apple, a second entry may identify a probability that a data sample that is predicted to be an apple is actually labeled a pear, and a third entry may identify a probability that a data sample that is predicted to be an apple is actually labeled an orange. Similar joint distributions may be calculated for pear and orange predictions.

At block 302, the training module 106 calculates a threshold based on the confusion matrix for each predicted label. In one embodiment, the joint probably values are used as the threshold values. In some embodiments, the threshold values may be based on a peak signal-to-noise ratio (PSNR) for the predicted class, that may be calculated based on the joint probability distributions for the predicted class. In one embodiment, the threshold value for a particular predicted class may be based on a difference between the probability of the predicted true label and the probability of the class. An example pseudocode for calculating the threshold values may be as follows:

Obtain a set of prediction probabilities (a matrix of size: n_samples*n_classes)

For each class c in n_classes:

Calculate (difference of class c)=(probability of the predicted true label)−(the probability of the class c); (size: n_samples*1)

Find the k-th smallest value of the difference of class c, as the threshold of the class c At block 304, the training module 106 identifies the noisy, unconfident data in the training dataset based on the computed threshold. For example, assuming that the joint probability distribution of apples being labeled as pears is 14%, the training module 106 may identify 14% of the data samples that are labeled as pears that also have a highest probability of being apples, as being noisy data. In some embodiments, a sample whose difference between the predicted true label and the probability of the class, is smaller than the threshold set for the class, is identified as a noisy data sample.

At block 306, the training module 106 labels and filters out the noisy data from the training dataset. For example, the training module 106 may label the noisy data as "noisy" or the like.

FIG. 4 is an example confusion matrix according to one embodiment. In the example of FIG. 4, the joint probability 400 of a data sample that is predicted to be an apple that is actually labeled an apple is 0.25. Also, the joint probability 402 of a data sample that is predicted to be an apple but is actually labeled as a pear is 0.14.

Figure 5:
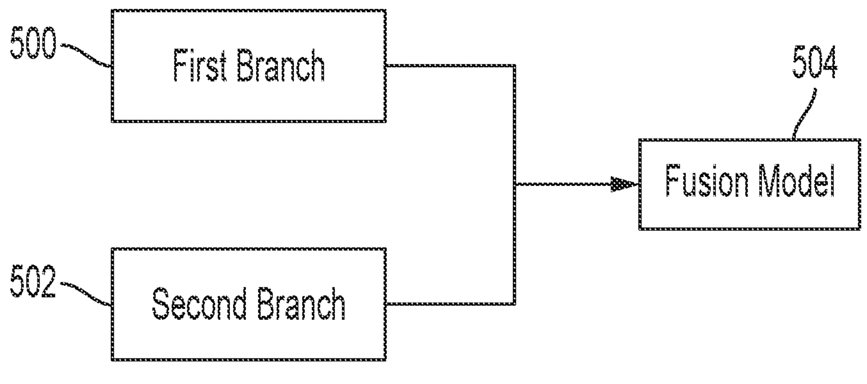
FIG. 5 is block diagram of defect detection implemented as a joint fusion model according to one embodiment.

FIG. 5 is block diagram of the defect detection model implemented as a joint fusion model according to one embodiment. The joint fusion model includes a first neural network branch 500 configured to receive a first set of cleaned data that has undergone confident learning, and a second neural network branch 502 configured to receive a second set of cleaned data that has also undergone confident learning. In one embodiment, the training module 106 trains each branch independently of the other branch, and joins the first branch 500 and the second branch 502 into a joint fusion model 504 through convolutional layers. The first set of data may be internally aligned, the second set of data may be internally aligned, and the first and second sets of data may not be aligned relative to each other. In one embodiment, the first set of data may include spectroscopy images, such as Energy-Dispersive X-ray Spectrocopy (EDS) used with High-Angle Annular Dark-Field (HAADF) images, and the second set of data may include microscopy images such as Transmission Electron Microscopy (TEM) images.

In one embodiment, each of the first branch 500 and the second branch 502 includes a respective attention module. The attention module for a neural network branch (e.g., the first neural network branch 500 or the second neural network branch 502) may be configured to overlay a spatial attention onto the images received by the neural network branch to highlight areas where a defect might arise. For example, a first attention module of the first branch 500 may overlay a first spatial attention heat map onto the first set of data received by the first branch 500, and a second attention module of the second branch 502 may overlay a second spatial attention heat map onto the second set of data received by the second branch 502. The attention module may include a space map network (e.g., corresponding to the spatial attention heat map) which is adjusted based on a final predicted label (error type/no error) of an input image. The space map network may represent a spatial relationship between the input image and the final predicted label.

The first set of data, which may be a set of spectroscopy images, may come in multiple channels (X channels in this example), each channel representing data related to specific chemical element or composition. Each neural network branch may include a channel attention module and a spatial attention module in the form of a Convolutional Block Attention Module (CBAM) (described below). In addition, a branch that uses a multiple-image source, such as the first branch 500, may include an extra channel attention module. The additional channel attention module may indicate which element input channels to focus on. In one embodiment, the joint fusion model allows product information obtained from disparate data collection circuits 100 to be integrated and trained together, so that the information may complement each other to make predictions about product manufacturing defects.

In one embodiment, the spatial attention module and the channel attention module are networks that are trained in a semi-supervised manner to force the larger neural network (e.g., the respective neural network branch) to put greater weight on data coming from the selected channel or spatial region. In training, the spatial/channel attention module learns which features are associated with errors, and in turn which spatial areas or channels are associated with the error via the associated features. Once trained, these modules operate within the larger neural network structure to force the neural network to pay "more attention" to select regions/channels (e.g., by setting one or more weights associated with the regions/channels). In some embodiments, the attention modules may be included in a CBAM, which is an effective attention module for feed-forward convolutional neural networks. Both the spectroscopy branch and the microscopy branch may include a CBAM which provides spatial and channel attention. The spatial attention may be a space-heat map related to error location, and the channel attention may be related to the color/grayscale channel of the data.

As mentioned above, within the first branch 500, there may be an extra channel attention module in addition to a CBAM. The CBAM provides a spatial heat map and color-channel attention feature. Thus, the additional channel attention module may focus attention on the channel that is associated with the target element that is of interest to the particular defect type.

Figure 6:
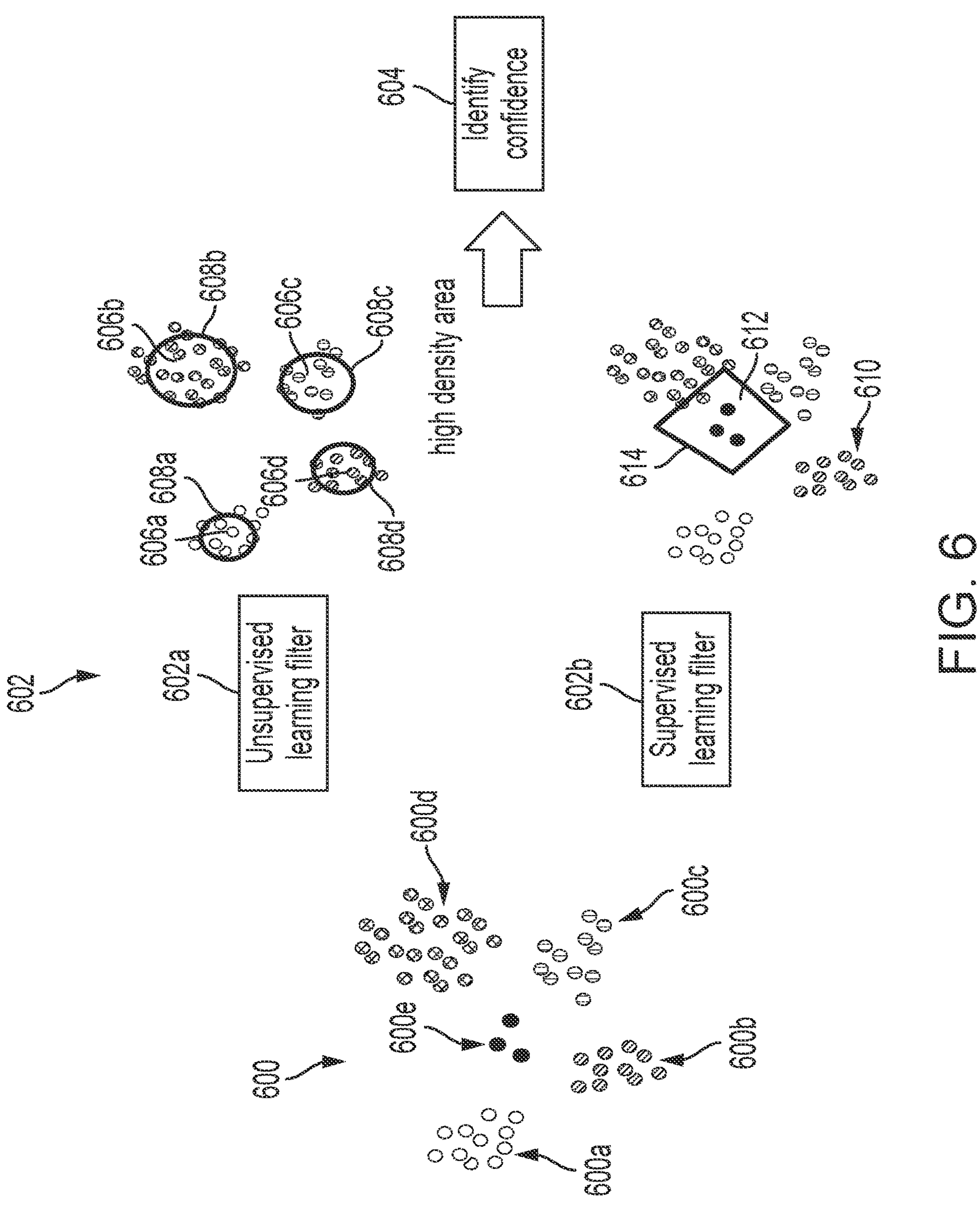
FIG. 6 is a conceptual layout diagram of data filtered by an outlier filter during a prediction stage according to one embodiment.

FIG. 6 is a conceptual layout diagram of data filtered by an outlier filter 602 during the prediction stage 208 according to one embodiment. In the embodiment of FIG. 6, data samples 600 acquired by the data collection circuits 100 for a manufactured product is provided to the outlier filter 602 for predicting confidence 604 of the data samples. The data samples may include data samples 600*a*-600*d* of a first type (e.g. clean/confident), and data samples 600*e* of a second type (e.g. noisy/not confident).

In one embodiment, the outlier filter is an unsupervised filter 602*a* for identifying a class to which a data sample belongs based on the associated data parameters. In the example of FIG. 6, the data samples 600*a*-660*d* of the first type are clustered into appropriate classes 606*a*-606*d*. The boundary of the classes may be set based on the tuning threshold. If the data sample is predicted to be within the boundary of an identified class, the data sample may be deemed to be confident data, and may be used by the defect detection model for making defect predictions.

In the example of FIG. 6 the data samples 600*e* of the second type do not belong to any of the clusters, and thus, may be deemed to be noisy/unconfident data. In one embodiment, the data samples 600*e* of the second type are rejected and not used by the defect detection model for making defect predictions.

In one embodiment, the outlier filter is a supervised filter 602*b* configured to classify the data samples 600 as clean/confident 610 or noisy/unconfident 612. As with the unsupervised filter, a decision boundary 614 that separates the confident from the unconfident data may be set based on the tuning threshold. In one embodiment, if the data sample is predicted to be noisy/unconfident, it is rejected and not used by the defect detection model for making defect predictions.

Figure 7:
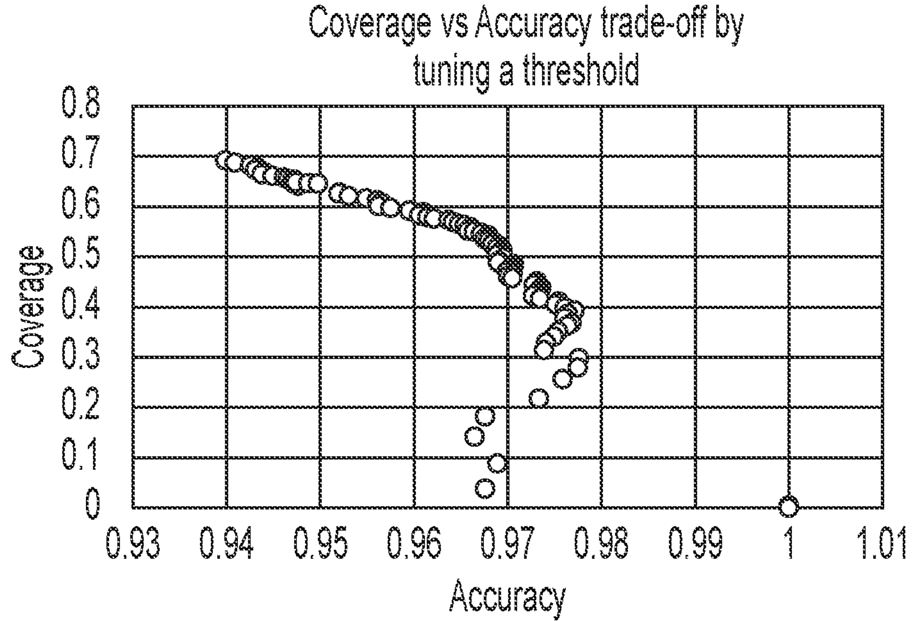
FIG. 7 is a graph of a tradeoff between accuracy and coverage when selecting a tuning threshold according to one embodiment.

FIG. 7 is a graph of a tradeoff between accuracy and coverage when selecting a tuning threshold according to one embodiment. The graph indicates that accuracy of predictions by the defect detection model increases as coverage decreases (i.e. more of the data samples are filtered out).

Figure 8:
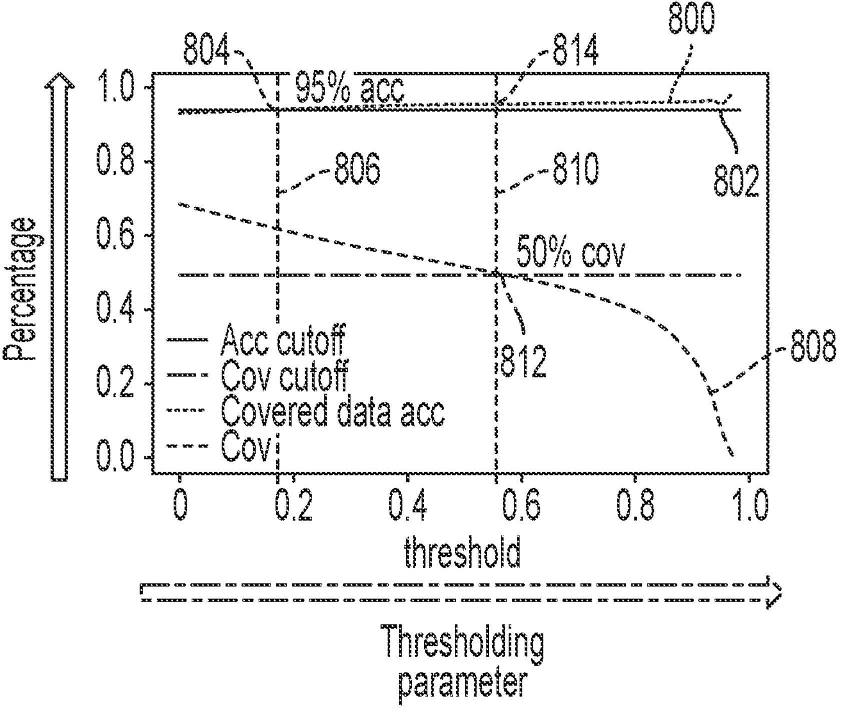
FIG. 8 is a graph of example tuning threshold values that may be calculated as a function of coverage and accuracy according to one embodiment.

FIG. 8 is a graph of example tuning threshold values that may be calculated as a function of coverage and accuracy according to one embodiment. The graph includes an accuracy curve 800 with an accuracy cutoff line 802 at 95% accuracy. The 95% accuracy point occurs at intersection point 804. A coverage cutoff line 806 that intersects the intersection point 805 at 95% accuracy also intersects a coverage curve 808 at about 65% coverage, and has a tuning threshold value of about 0.17. Thus, in this example, a tuning threshold value of 0.16 yields a prediction accuracy of 95% and coverage of 65%. On the other hand, as depicted via coverage cutoff line 810, decreasing coverage to 50% (intersection point 812) increases the prediction accuracy to around 97% (intersection point 814). The associated tuning threshold also increases to about 0.57. In one embodiment, the training module 106 is configured to run a function that outputs a tuning threshold value based on an input of a desired accuracy value and/or coverage value.

In some embodiments, the systems and methods for identifying manufacturing defects discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for identifying manufacturing defects have been specifically described and illustrated herein, many modifications and variations will be apparent to those skilled in the art. Accordingly, it is to be understood that a system and method for identifying manufacturing defects constructed according to principles of this disclosure may be embodied other than as specifically described herein. The disclosure is also defined in the following claims, and equivalents thereof.

What is claimed is:

1. A method for classifying manufacturing defects comprising:

identifying, from a training dataset, a first data sample and a second data sample;

identifying, by a processor, a first label predicted for the first data sample;

comparing, by the processor, the first label to a second label assigned to the first data sample;

determining, by the processor, a labeling error for the first label based on the comparing, wherein the determining of the labeling error is based on estimating a joint probability distribution between the first label and the second label;

based on determining the labeling error for the first label:

removing, by the processor, from the training dataset, the first data sample and outputting a filtered training dataset including the second data sample;

training, by the processor, a first machine learning model with the filtered training dataset; and training, by the processor, a second machine learning model based on at least one of the first data sample or the second data sample;

receiving, by the processor, a second dataset including first product data and second product data associated with a manufactured product, wherein the first product data includes a first image of a product in a production line and the second product data includes a second image of the product in the production line;

invoking, by the processor, the second machine learning model for predicting a first confidence of the first product data and a second confidence of the second product data;

removing, by the processor, the second product data from the second dataset based on determining the second confidence and outputting a modified second dataset;

invoking, by the processor, the first machine learning model for generating a classification based on the modified second dataset;

detecting, based on the classification, that the first image contains a manufacturing defect of the product in the production line; and removing the product from the production line based on the detecting of the manufacturing defect.

2. The method of claim 1, wherein the second data sample is associated with a confidence level above a set threshold.

3. The method of claim 1, wherein the training of the second machine learning model includes invoking unsupervised learning based on the second data sample, wherein the second data sample is associated with a particular class.

4. The method of claim 3, wherein the training of the second machine learning model includes:

identifying a cluster associated with the particular class; and tuning a boundary of the cluster based on a tuning threshold, wherein the first machine learning model is invoked for generating the classification in response to determining that the first product data is within the boundary of the cluster.

5. The method of claim 1, wherein the training of the second machine learning model includes invoking supervised learning based on the first and second data samples, wherein the first data sample is identified as a first type of data, and the second data sample is identified as a second type of data.

6. The method of claim 5, wherein the training of the second machine learning model includes:

identifying a decision boundary for separating the first type of data from a second type of data; and tuning the decision boundary based on a tuning threshold, wherein the first machine learning model is invoked for generating the classification in response to determining that the first product data belongs to the second type of data.

7. The method of claim 1 further comprising:

generating a signal based on the classification, wherein the signal is for triggering an action with respect to the product.

8. A system for classifying manufacturing defects, the system comprising:

processor; and memory, wherein the memory has stored therein instructions that, when executed by the processor, cause the processor to:

identify, from a training dataset, a first data sample and a second data sample;

identify a first label predicted for the first data sample;

compare the first label to a second label assigned to the first data sample;

determine a labeling error for the first label based on the comparing, wherein the processor being configured to determine the labeling error include the processor being configured to estimate a joint probability distribution between the first label and the second label;

based determining the labeling error for the first label:

remove, from the training dataset, the first data sample and outputting a filtered training dataset including the second data sample;

train a first machine learning model with the filtered training dataset; and train a second machine learning model based on at least one of the first data sample or the second data sample;

receive a second dataset including first product data and second product data associated with a manufactured product, wherein the first product data includes a first image of a product in a production line and the second product data includes a second image of the product in the production line;

invoke the second machine learning model for predicting a first confidence of the first product data and a second confidence of the second product data;

remove the second product data from the second dataset based on determining the second confidence and outputting a modified second dataset;

invoke the first machine learning model for generating a classification based on the modified second dataset;

detect, based on the classification, that the first image contains a manufacturing defect of the product in the production line; and remove the product from the production line based on detecting the manufacturing defect.

9. The system of claim 8, wherein the second data sample is associated with a confidence level above a set threshold.

10. The system of claim 8, wherein the instructions that cause the processor to train the second machine learning model include instructions that cause the processor to invoke unsupervised learning based on the second data sample, wherein the second data sample is associated with a particular class.

11. The system of claim 10, wherein the instructions that cause the processor to train the second machine learning model include instructions that cause the processor to:

identify a cluster associated with the particular class; and tune a boundary of the cluster based on a tuning threshold, wherein the first machine learning model is invoked for generating the classification in response to determining that the first product data is within the boundary of the cluster.

12. The system of claim 8, wherein the instructions that cause the processor to train the second machine learning model include instructions that cause the processor to invoke supervised learning based on the first and second data samples, wherein the first data sample is identified as a first type of data, and the second data sample is identified as a second type of data.

13. The system of claim 12, wherein the instructions that cause the processor to train the second machine learning model include instructions that cause the processor to:

identify a decision boundary for separating the first type of data from a second type of data; and tune the decision boundary based on a tuning threshold, wherein the first machine learning model is invoked for generating the classification in response to determining that the first product data belongs to the second type of data.

14. The system of claim 8, wherein the instructions further cause the processor to:

generate a signal based on the classification, wherein the signal is for triggering an action with respect to the product.

15. A system for classifying manufacturing defects, the system comprising:

a data collection circuit configured to collect an input dataset; and a processing circuit coupled to the data collection circuit, the processing circuit having logic for:

identifying, from a training dataset, a first data sample and a second data sample;

identifying a first label predicted for the first data sample;

comparing the first label to a second label assigned to the first data sample;

determining a labeling error for the first label based on the comparing, wherein the determining of the labeling error is based on estimating a joint probability distribution between the first label and the second label;

based on determining the labeling error for the first label:

removing, from the training dataset, the first data sample and outputting a filtered training dataset including the second data sample;

training a first machine learning model with the filtered training dataset; and training a second machine learning model based on at least one of the first data sample or the second data sample;

receiving a second dataset including first product data and second product data associated with a manufactured product, wherein the first product data includes a first image of a product in a production line and the second product data includes a second image of the product in the production line;

invoking the second machine learning model for predicting a first confidence of the first product data and a second confidence of the second product data;

removing the second product data from the second dataset based on determining the second confidence and outputting a modified second dataset;

invoking the first machine learning model for generating a classification based on the modified second dataset;

detecting, based on the classification, that the first image contains a manufacturing defect of the product in the production line; and removing the product from the production line based on detecting the manufacturing defect.

* * * * *